Patented Feb. 22, 1938

2,108,857

UNITED STATES PATENT OFFICE 2,108,857

PROCESS FOR THE PRODUCTION OF ARTIFICIAL MASSES FROM VINYL ESTERS

Heinrich Hopff, Paul Garbsch, and Fritz Teller, Ludwigshafen-on-the-Rhine, Germany, assignors to I. G. Farbenindustrie Aktiengesellschaft, Frankfort-on-the-Main, Germany No Drawing. Application December 11, 1930, Serial No. 501,664. In Germany December 23, 1929

9 Claims. (Cl. 260—2)

The present invention relates to improvements in the production of artificial masses.

Hitherto it has not been possible to obtain uniform highly polymerized products in the polymerization of vinyl esters but products which are still soluble in organic solvents are always obtained. From these solutions products of different viscosity may be isolated by fractional precipitation, which fact is a proof that the products obtained are not uniform. These mixed products are well suited for the preparation of lacquers and adhesives but are practically of no use for the preparation of plastic masses by reason of their small stability to heat, their low mechanical strength and their cold-shortness.

We have now found that new polymerization products from vinyl esters, such as vinyl chloride, vinyl acetate or vinyl chloracetate or mixtures thereof having very valuable properties are obtained by heating the vinyl esters to from about 40° to about 160° C. in the presence of organic or inorganic "per-compounds", such as barium peroxide, benzoyl peroxide, persulphates, percarbonates and especially perborates, and anhydrides of strong fatty acids in the absence of solvents or diluents until the resulting products are practically insoluble in the usual oxygenated organic solvents, such as ethyl acetate, acetone or ethyl alcohol and are only capable of swelling therein. The yield of polymerized vinyl esters is practically quantitative. When the reaction products are treated with organic solvents, even while heating, at the most only traces of soluble constituents can be isolated. The quantity of per-compound employed is generally between 0.1 and 10 per cent and the quantity of anhydride is generally from 5 to 10 times that of the per-compounds, the quantity of the latter being diminished with the higher quantities of peroxide.

The products obtained are eminently suitable for the preparation of plastic masses and are characterized, in contrast with the soluble polymerization products of vinyl esters already known, by considerably greater stability to heat, elasticity and strength.

The polymerized vinyl alcohols obtainable by saponification of the insoluble polymerized vinyl esters are still soluble and yield extremely viscous solutions, the viscosity of which is much higher than that of the polymeric vinyl alcohols obtained by saponification of vinyl esters polymerized by the methods hitherto known, the viscosity of an aqueous 2 per cent solution being about 2½ that of a solution of the known products. By treating these polymerized vinyl alcohols with aldehydes, as for example such as formaldehyde, acetaldehyde, crotonaldehyde or polymers thereof, such as trioxy-methylene, or metaldehyde, in the presence of acid catalysts, such as aluminium chloride, mineral acids, zinc chloride, sodium bisulphate and the like, products are obtained which may be worked up into transparent masses having valuable properties.

The following examples will further illustrate the nature of this invention, but the invention is not restricted to these examples. The parts are by weight.

Example 1

1000 parts of vinyl acetate are boiled under a reflux condenser, while stirring, with 2 parts of sodium perborate and 10 parts of acetic anhydride. As soon as the polymerization has commenced, 2000 parts of fresh monomeric vinyl acetate are allowed to flow in. After a few hours the mixture becomes so thick and viscous that the stirring has to be discontinued. The polymerization product is then for the greater part insoluble. The whole is further heated for some time, but not appreciably above the boiling point of the monomeric vinyl ester, until the polymerization product has become entirely insoluble, for example in ethyl acetate.

Example 2

1000 parts of vinyl chloracetate are subjected to a heat treatment with 2 parts of sodium perborate and 10 parts of acetic anhydride in the manner described in Example 1. The polymerization in this case proceeds much more rapidly and leads to products which are entirely insoluble.

Example 3

1000 parts of the insoluble polymerized vinyl acetate obtained according to Example 1 are heated with 20,000 parts of 2 per cent hydrochloric acid until the whole has passed into solution. The resulting polymerized vinyl alcohol may be obtained in a solid form by evaporation, advantageously in vacuo and is suitable for use as plastic dispersing agents in the preparation of dyestuff pastes or similar dispersions and as a sizing or dressing agent.

Example 4

1000 parts of vinyl chloride are heated in a stirring autoclave for 6 hours at 60° C. together with 2 parts of sodium perborate and 15 parts of acetic anhydride. The polymerization product obtained is freed from acetic anhydride by washing with tepid water and is capable of being only swelled by chlorbenzene and epichlorhydrin.

By pressing, while heating, artificial masses are obtained from the said polymerization product which have a higher resistance to heat and a higher strength than the polymerization products obtainable from the same initial material by the methods hitherto known.

*Example 5*

1000 parts of vinyl acetate are boiled gently under a reflux condenser together with 2 parts of boroacetic anhydride (described in "Berichte der Deutschen Chemischen Gesellschaft", Vol. 36, 1903, page 2219) and 2 parts of benzoyl peroxide. Heating is then stopped and 2000 parts of fresh vinyl acetate are then added so slowly that the reaction mixture is kept boiling slightly. As soon as the reaction has ceased the reaction mixture is warmed for a short time until the polymerization product is capable only of swelling in ethyl alcohol or in acetic ethyl ester.

*Example 6*

100 parts of the insoluble, polymerized vinyl acetate prepared according to Example 1 are mixed with 1000 parts of anhydrous ethyl alcohol whereupon the mixture is left standing for 24 hours whereby the vinyl acetate is swollen. 50 parts of concentrated sulphuric acid are then dropped into the mixture while intimately stirring and stirring is continued until the polymerized vinyl acetate is completely saponified, the acetate being thereby converted into white, pulverulent polymeric vinyl alcohol and the acetic acid formed being converted into ethyl acetate. The liquid constituents of the reaction mixture are then filtered off and the polymerized vinyl alcohol is freed from acid in any usual and convenient manner, preferably by dialysis. The product obtained is soluble in water with the formation of solutions having a very high viscosity which, when measured for example with the 2 per cent solution in an Ubbelohde viscosimeter, is about twice or even more that of solutions of a polymerized vinyl alcohol which has been prepared by the saponification of polymerized vinyl acetate, which has been polymerized by heating and/or with the aid of peroxides solely. If the solution of polymerized vinyl alcohol be incorporated with basic agents solid jellies are formed.

What we claim is:—

1. In the production of artificial masses by heat polymerization of vinyl esters, the step which comprises carrying out the reaction in the presence of a per-compound, capable of furnishing hydrogen peroxide on hydrolysis, and of an anhydride of a strong fatty acid, but in the absence of solvents and diluents, until the products of the reaction are insoluble in organic oxygenated solvents.

2. In the production of artificial masses by heat polymerization of vinyl esters, the step which comprises carrying out the reaction in the presence of a per-compound, capable of furnishing hydrogen peroxide on hydrolysis, and of an anhydride of a strong fatty acid, but in the absence of solvents and diluents, until the products of the reaction are insoluble in organic oxygenated solvents, and saponifying the resulting product.

3. In the production of artificial masses by heat polymerization of vinyl esters, the step which comprises carrying out the reaction in the presence of a per-salt, capable of furnishing hydrogen peroxide on hydrolysis, and of an anhydride of a strong fatty acid, but in the absence of solvents and diluents, until the products of the reaction are insoluble in organic oxygenated solvents.

4. In the production of artificial masses by heat polymerization of vinyl esters, the step which comprises carrying out the reaction in the presence of an alkali metal perborate and acetic anhydride.

5. In the production of artificial masses by heat polymerization of vinyl acetate, the step which comprises carrying out the reaction in the presence of a per-compound, capable of furnishing hydrogen peroxide on hydrolysis, and of an anhydride of a strong fatty acid, but in the absence of solvents and diluents, until the products of the reaction are insoluble in organic oxygenated solvents.

6. In the production of artificial masses by heat polymerization of vinyl acetate, the step which comprises carrying out the reaction in the presence of sodium perborate and acetic anhydride, but in the absence of solvents and diluents, until the products of the reaction are insoluble in organic oxygenated solvents.

7. In the production of artificial masses by heat polymerization of vinyl acetate, the step which comprises carrying out the reaction in the presence of sodium perborate and acetic anhydride, but in the absence of solvents and diluents, until the products of the reaction are insoluble in organic oxygenated solvents, and saponifying the resulting product.

8. Polymerized vinyl alcohols obtainable by saponifying polymerized vinyl esters, prepared by polymerization in the presence of a per-compound capable of furnishing hydrogen peroxide on hydrolysis, and of an anhydride of a strong fatty acid, but in the absence of solvents and diluents, until the products of the reaction are insoluble in oxygenated solvents, the 2 per cent solutions of which polymerized vinyl alcohols in water possess a viscosity about twice that of polymeric alcohols from the saponification of polymeric vinyl esters polymerized in the absence of anhydrides of organic acids.

9. In the production of artificial masses by heat polymerization of vinyl esters, the step which comprises carrying out the reaction in the presence of an alkali metal perborate and acetic anhydride, but in the absence of solvents and diluents, until the products of the reaction are insoluble in organic oxygenated solvents.

HEINRICH HOPFF.
PAUL GARBSCH.
FRITZ TELLER.